US009507577B2

(12) United States Patent
Khalidi et al.

(10) Patent No.: US 9,507,577 B2
(45) Date of Patent: Nov. 29, 2016

(54) AUTOMATED CONTROLLING OF HOST OVER NETWORK

(75) Inventors: Yousef A. Khalidi, Bellevue, WA (US); Deepak Bansal, Sammamish, WA (US); Changhoon Kim, Bellevue, WA (US); Srikanth Kandula, Redmond, WA (US); David A. Maltz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 386 days.

(21) Appl. No.: 13/530,064

(22) Filed: Jun. 21, 2012

(65) Prior Publication Data
US 2013/0346968 A1    Dec. 26, 2013

(51) Int. Cl.
G06F 9/455    (2006.01)
G06F 9/445    (2006.01)
G06F 9/50     (2006.01)

(52) U.S. Cl.
CPC .............. *G06F 8/61* (2013.01); *G06F 9/5072* (2013.01)

(58) Field of Classification Search
None
See application file for complete search history.

(56) References Cited

U.S. PATENT DOCUMENTS

| 6,484,318 | B1 * | 11/2002 | Shioda et al. ................ 725/110 |
| 2008/0022274 | A1 | 1/2008 | Shieh |
| 2009/0300149 | A1 | 12/2009 | Ferris et al. |
| 2010/0058325 | A1 | 3/2010 | Macken et al. |
| 2012/0131179 | A1 * | 5/2012 | Hu ............................... 709/224 |
| 2013/0103845 | A1 * | 4/2013 | Kuwahara ............ H04L 12/146 709/228 |

FOREIGN PATENT DOCUMENTS

GB    2311390 A    9/1997

OTHER PUBLICATIONS

Armbrust, et al., "Above the Clouds: A Berkeley View of Cloud Computing", In Technical Report No. UCB/EECS-2009-28, University of California at Berkley, Feb. 10, 2009, 25 pages.
Lu, et al., "Can Cloud Computing be Used for Planning? An Initial Study", Retrieved on: Dec. 29, 2011, Available at: www.cse.wustl.edu/~ychen/public/cloudcom11.pdf.
Hirschfeld, et al., "Bootstrapping OpenStack Clouds", Retrieved on: Dec. 29, 2011, Available at: www.rackspace.com/downloads/pdfs/dell_tech_wp-bootstrapping_openstack_clouds_v2.pdf.
"Windows Azure Bootstrapper", Retrieved on: Dec. 29, 2011, Available at: bootstrap.codeplex.com/.

(Continued)

*Primary Examiner* — Mengyao Zhe
(74) *Attorney, Agent, or Firm* — Ben Tabor; Doug Barker; Micky Minhas

(57) ABSTRACT

The provisioning of a host computing system by a controller located over a wide area network. The host computing system has power-on code that automatically executes upon powering up, and causes the host to notify the controller of the host address. In a first level of bootstrapping, the controller instructs the host to download a maintenance operating system. The host responds by downloading and installing a maintenance operating system, enabling further bootstrapping. The persistent memory may further have security data, such as a public key, that allows the host computing system to securely identify the source of the download instructions (and subsequent instructions) as originating from the controller. A second level of bootstrapping may accomplish the configuring of the host with a hypervisor and a host agent. A third level of bootstrapping may accomplish the provisioning of virtual machines on the host.

16 Claims, 7 Drawing Sheets

(56) References Cited

OTHER PUBLICATIONS

Kommalapati, Hanu, "Windows Azure for Enterprises", Retrieved on: Dec. 29, 2011, Available at: msdn.microsoft.com/en-us/magazine/ee309870.aspx.

Shinder, Debra Littlejohn, "10 Reasons to use Azure for your Cloud Apps", Published on: Jan. 6, 2010, Available at: www.techrepublic. com/blog/10things/10-reasons-to-use-azure-for-your-cloud-apps/1282.

Buyya, et al., "InterCloud: Utility-Oriented Federation of Cloud Computing Environments for Scaling of Application Services", In Proceedings of the 10th International Conference on Algorithms and Architectures for Parallel Processing, Mar. 20, 2010, pp. 13-31.

"International Search Report & Written Opinion for PCT Patent Application No. PCT/US2013/045291", Mailed Date: Sep. 20, 2013, Filed Date: Jun. 12, 2013, 9 Pages.

\* cited by examiner

200

Host
201

210

203

Controller
202

AUTOMATED CONTROLLING OF HOST OVER NETWORK

BACKGROUND

"Cloud computing" is a model for enabling ubiquitous, convenient, on-demand network access to a shared pool of configurable computing resources (e.g., networks, servers, storage, applications, and services). The shared pool of configurable computing resources can be rapidly provisioned via virtualization and released with low management effort or service provider interaction, and then scaled accordingly. A cloud computing model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). An environment that implements the cloud computing model is often referred to as a cloud computing environment.

In a typical cloud computing environment, a cluster of host computing systems provide services to clients. As an example, the host computing systems might operate virtual machines corresponding to the client. Conventionally, each cluster includes a local controller that functions to bootstrap a new host with the appropriate hypervisor and host agent, and thereafter assist in provisioning new virtual machines that operate over the hypervisor in the host.

BRIEF SUMMARY

At least one embodiment described herein relates to a system that includes a host computing system and a controller that is communicatively coupled to the host computing system over a wide area network, as opposed to conventional controllers, which are located locally, within the same cluster as the host computing system.

The host computing system has persistent memory that stores an address of the host computing system and an address of the controller. Furthermore, the host computing system has power-on code that automatically executes upon powering up the host computing system, and that causes the host computing system to notify the controller of the address of the host computing system. In a first level of bootstrapping, the controller instructs the host computing system to download a maintenance operating system. The host computing system initially has download code that enables the host computing system to respond to the download instruction, to thereby cause the host computing system to download and install a maintenance operating system. Further bootstrapping may further be accomplished.

In accordance with some embodiments herein, the host computing system is further provisioned prior to this first stage of bootstrapping with security data that allows the host computing system to securely identify the source of the download instructions (and subsequent instructions) as originating from the controller. For instance, the persistent memory of the host computing system may have a public key corresponding to a private key held by the controller, and decryption code that allows the host computing system to decrypt communications that were transmitted and encrypted by the controller.

In accordance with some embodiments described herein, the host computing system may use the maintenance operating system to respond to more diverse provisioning instructions received from the controller. This second level of bootstrapping causes the host computing system to be more specifically provisioned with a hypervisor and a host agent. The host agent may cooperatively interact with the controller yet further, in a third level of bootstrapping, to allow specific virtual machines to be provisioned on the host computing system.

Accordingly, a host computing system may be provisioned even without a controller being present locally in the same cluster as the host computing system. Optionally, the controller may be part of another cluster of host computing systems and may serve as a remote controller for yet other clusters of host computing systems, thus enabling a wide variety of controller/host topologies.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the provisioning of a host computing system by a controller located over a network is described. The host computing system has power-on code that automatically executes upon powering up, and causes the host computing system to notify the controller of the host address. In a first level of bootstrapping, the controller instructs the host computing system to download a maintenance operating system. The host responds by downloading and installing a maintenance operating system, enabling further bootstrapping.

The persistent memory may further have security data, such as a public key, that allows the host computing system to securely identify the source of the download instructions (and subsequent instructions) as originating from the controller. A second level of bootstrapping may accomplish the configuring of the host computing system with a hypervisor and a host agent. A third level of bootstrapping may accomplish the provisioning of virtual machines on the host. First, some introductory discussion regarding computing systems will be described with respect to FIG. 1. Then, embodiments of the system will be described with respect to FIGS. 2 through 11.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
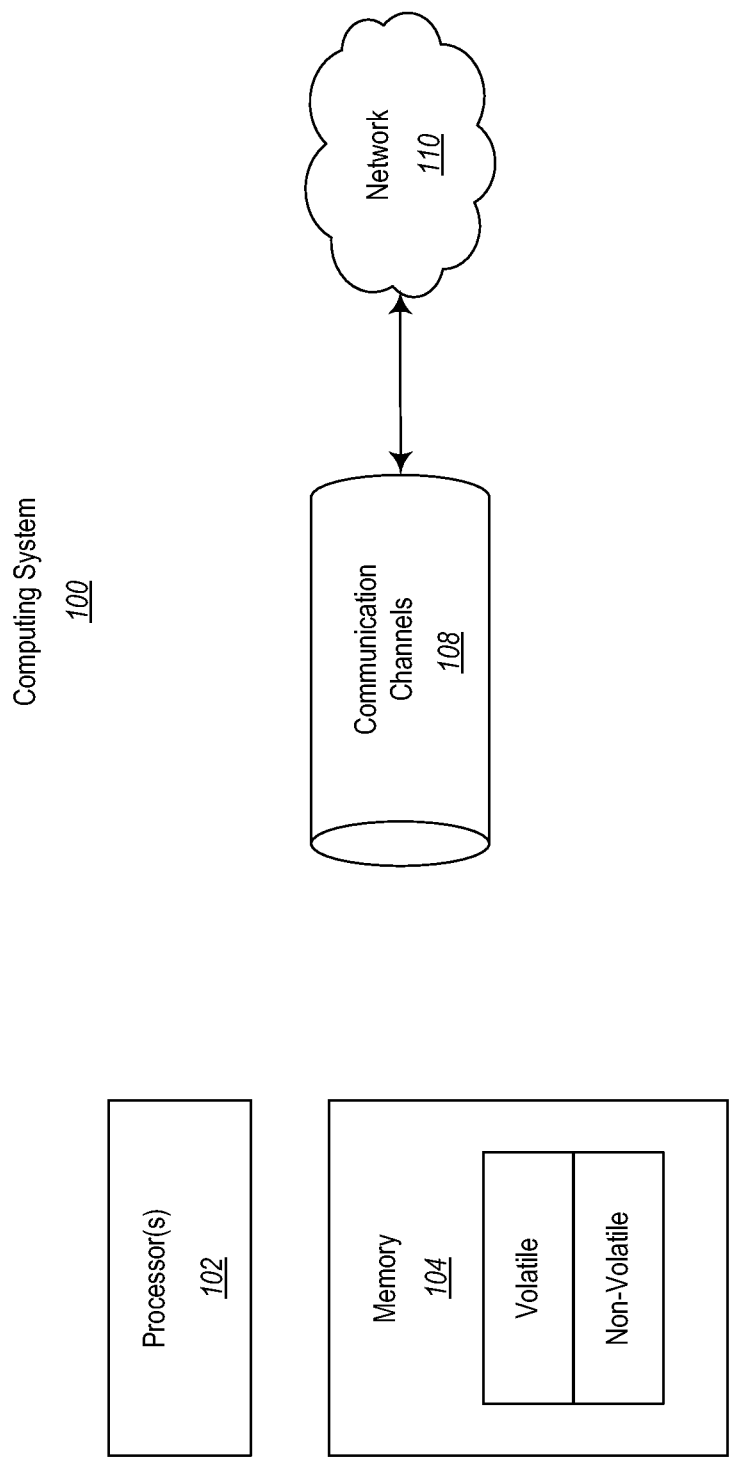
FIG. 1 illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
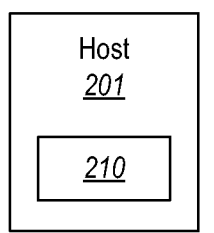
FIG. 2 abstractly illustrates a system in which a host computing system is communicatively coupled to a controller via a network, and in which the controller may interact with the host computing system to provision the host computing system, and in which the provisioning is bootstrapped using bootstrap data/code present on the host computing system.
Figure 2:
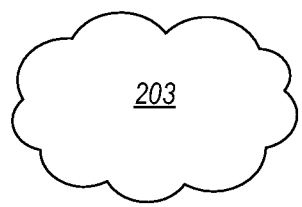
Figure 2:
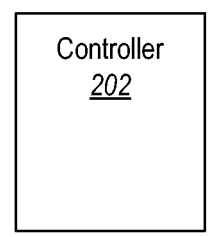

FIG. 2 illustrates a system 200 in which a host computing system 201 is communicatively coupled to a controller 202 via a network 203. In this description and in the claims, two entities are "communicatively coupled" if they are capable of communicating with each other. The host computing system 201 may be structured as described above for the computing system 100 of FIG. 1. The controller 202 may likewise be a computing system such as the computing system 100 of FIG. 1, or perhaps a software module running on such a computing system. The network 203 may be, for example, the Internet, a wide area network, a local area network, an enterprise network, or any other kind of network. In some embodiments, the system 200 may be incorporated into a cloud computing environment.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The host computing system 201 initially has only bootstrap data/code 210 thereon. Such bootstrap data/code 210 is present in persistent memory such that it is present when the host computing system 201 is initially booted up. The bootstrap data/code 210 is used to allow the host computing system 201 to take steps to communicate with the controller 202 over network 203 so that the host computing system 201 can have a fully operational hypervisor and host agent capable of providing an environment in which virtual machines may operate. This final end state of the provisioning process of the host computing system will now be described before describing more regarding the provision process.

Figure 3:
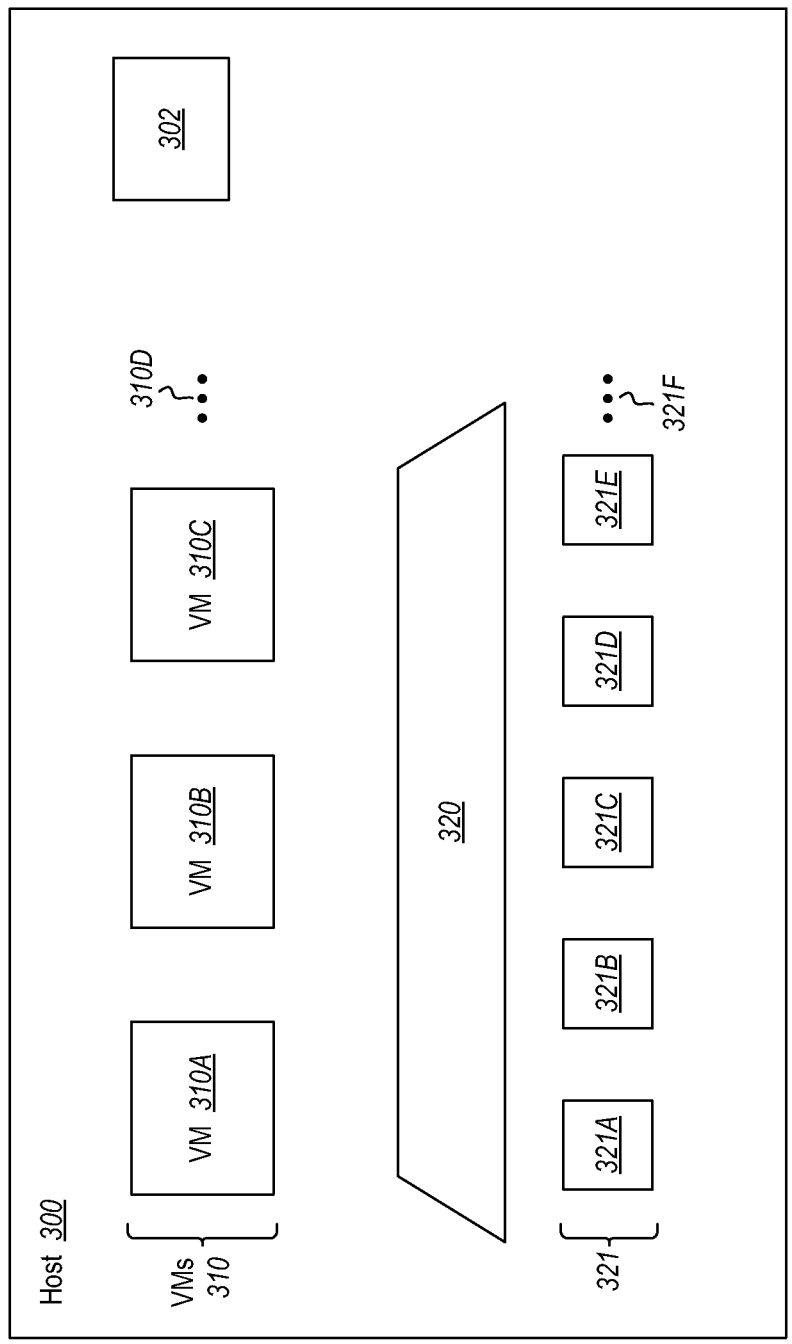
FIG. 3 abstractly illustrates a host that runs virtual machines, and in which physical resources are utilized via a hypervisor that abstracts the physical resources from the virtual machines, and instead presents virtual resources for the virtual machines.

A host computing system, once fully provisioned, is capable of running one or more, and potentially many, virtual machines. For instance, FIG. 3 abstractly illustrates a host computing system 300 in further detail. As an example, the host computing system 300 might represent the host computing system 201 after having been provisioned using the techniques described with respect to FIGS. 4 through 8 hereinafter. In the case of FIG. 3, the host 300 is illustrated as operating three virtual machines 310 including virtual machines 310A, 310B and 310C. However, the ellipses 310D represent that the principles described herein are not limited to the number of virtual machines running on the host 300. There may be as few as zero virtual machines running on the host computing system with the only upper limit being defined by the physical capabilities of the host 300.

During operation, the virtual machines emulates a fully operational computing system including an at least an operating system, and perhaps one or more other applications as well. Each virtual machine may be used to run applications such as services that interact with other applications or programs that interact with human users.

The host computing system 300 includes a hypervisor 320 that emulates virtual resources for the virtual machines 310 using physical resources 321 that are abstracted from view of the virtual machines 310. The hypervisor 321 also provides proper isolation between the virtual machines 310. Thus, from the perspective of any given virtual machine, the hypervisor 320 provides the illusion that the virtual machine is interfacing with a physical resource, even though the virtual machine only interfaces with the appearance (e.g., a virtual resource) of a physical resource, and not with a physical resource directly. In FIG. 3, the physical resources 321 are abstractly represented as including resources 321A through 321F. Examples of physical resources 321 including processing capacity, memory, disk space, network bandwidth, media drives, and so forth. The host computing system 300 may operate a host agent 302 that monitors the performance of the host computing system, and performs other operations that manage the host computing system.

Figure 4:
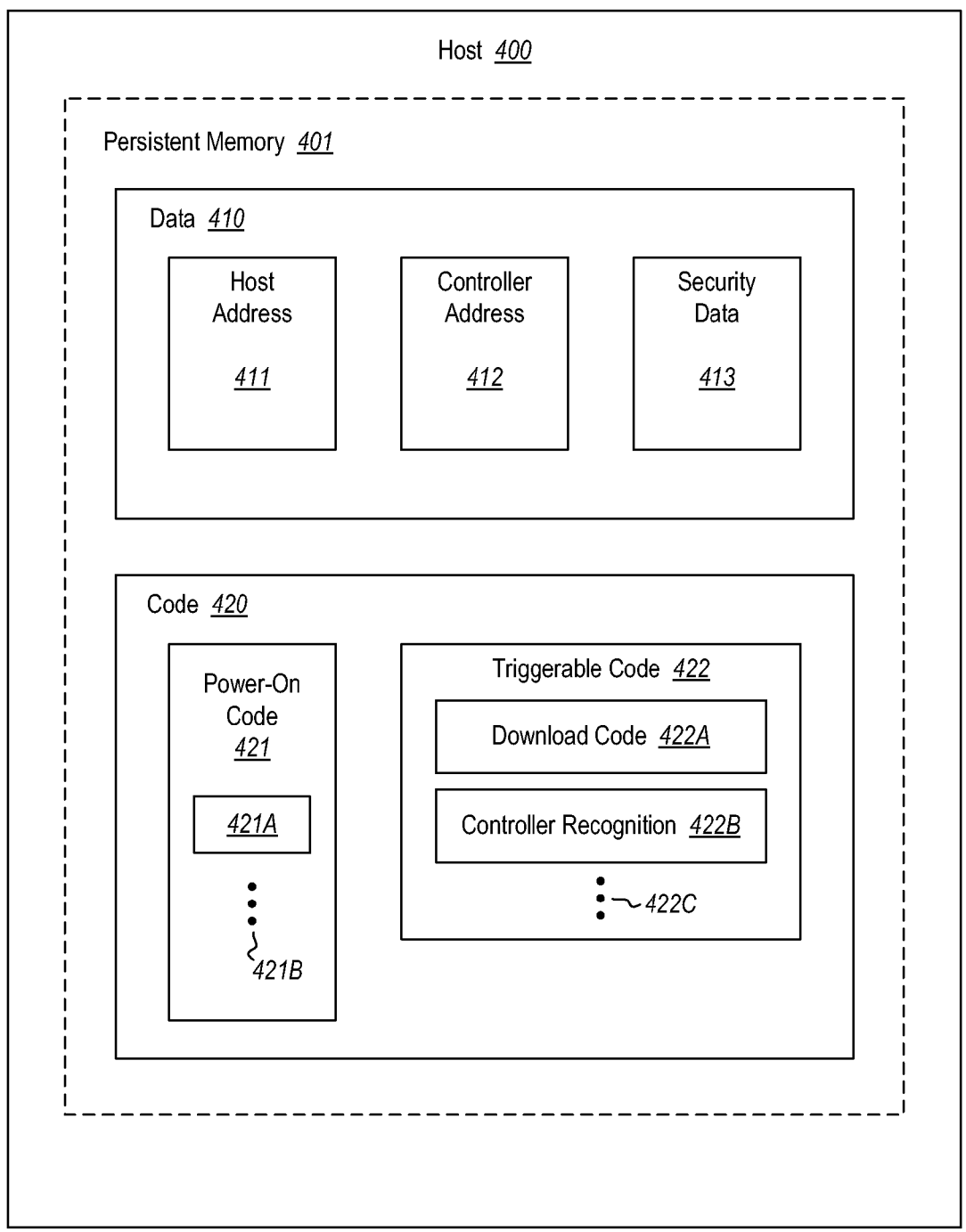
FIG. 4 illustrates a host computing system that represents an example of the host computing system of FIG. 2 before the bootstrapped provisioning process has begun, and in which the bootstrap data/code is illustrated in further detail.

FIG. 4 illustrates a host computing system 400 that represents an example of the host computing system 201 of FIG. 2 prior to the bootstrapped provisioning process. The host computing system 400 has a persistent memory 401 that stores data 410 and code 420. The combination of the data 410 and code 420 represents an example of a bootstrap data/code 210 of FIG. 2. This data 410 and code 420 occupies a small amount of memory, and can fit in firmware of a computing system. Thus, firmware is an example of the persistent memory 401 of FIG. 4. Regardless, the persistent memory 401 is capable of holding data that persists when written to the firmware, and survives to the next powering up of the host computing system 400.

The data 410 includes a host address 411 of the host computing system 400 (e.g., host computing system 201) and a controller address 412 of the controller 202. In addition, the data 410 may include security data 413 that allows the host computing system 400 to recognize communications as being transmitted by the controller 202. For instance, the security data 413 may be a public key corresponding to a private key in possession of, corresponding to, or held by the controller 202. Thus, the host computing system 201 may use the public key to decrypt communications that were encrypted by the controller 202 using the corresponding private key.

The code 420 includes power-on code 421 that is configured to automatically execute upon powering up the host computing system. For instance, the power-on code 421 includes controller notification code 421A although the ellipses 421B represent that there may be other code that also automatically executes upon powering up the host computing system. The controller notification code 421A notifies the controller 202 of the host address using the controller address of the controller. For instance, the host address and controller address may be Internet Protocol (IP) addresses. In that case, the controller notification code 421A may be any code that is capable of using the IP protocol to dispatch a message to the IP address of the controller and that includes a payload that includes the IP address of the host.

The code 420 also includes triggerable code 422, which is code that does not automatically execute upon powering up the host computing system, but rather is triggered upon other certain events happening. For instance, download code 422A, when executed, causes the host computing system 201 to download and install a maintenance operating system instance in response to a download instruction from the controller and thus complete a first stage of bootstrapped provisioning of the host computing system. Such an installed maintenance operation system allows the host computing system to respond to further and much more varied and customized instructions from the controller. For instance, the further instructions may cause the host computing system to use the maintenance operating system instance to provision the host computing system with a host agent and a hypervisor. This further provisioning represents a second stage in the bootstrapped provisioning of the host computing system, and presents the host computing system in ready form for operation of virtual machines.

The triggerable code also includes controller recognition code 422B that, when executed, allows the host computing system to recognize communications as being transmitted by the controller. As an example, perhaps the controller recognition code 422B uses a public key to decrypt communications from the controller that were encrypted using the corresponding private key. Assuming that the private key is in the exclusive possession of the controller, the host computing system 201 can then authenticate that the communication indeed came from the controller 202 based on the very fact that decryption was successful in producing a readable payload message.

The ellipses 422C represent that the triggerable code 422 may include other code also that is triggerable in response to certain events. Although the data 410 and code 420 are illustrated as covering a large area of the host 400 in FIG. 4, this is just so that the components of the persistent memory 401 can be clearly illustrated. The actual space occupied by the data 410 and code 420 may actually be quite small compared to the overall memory and storage capacity of the host computing system 400, and perhaps be persistently stored in firmware shipped with the host computing system 400.

Figure 5:
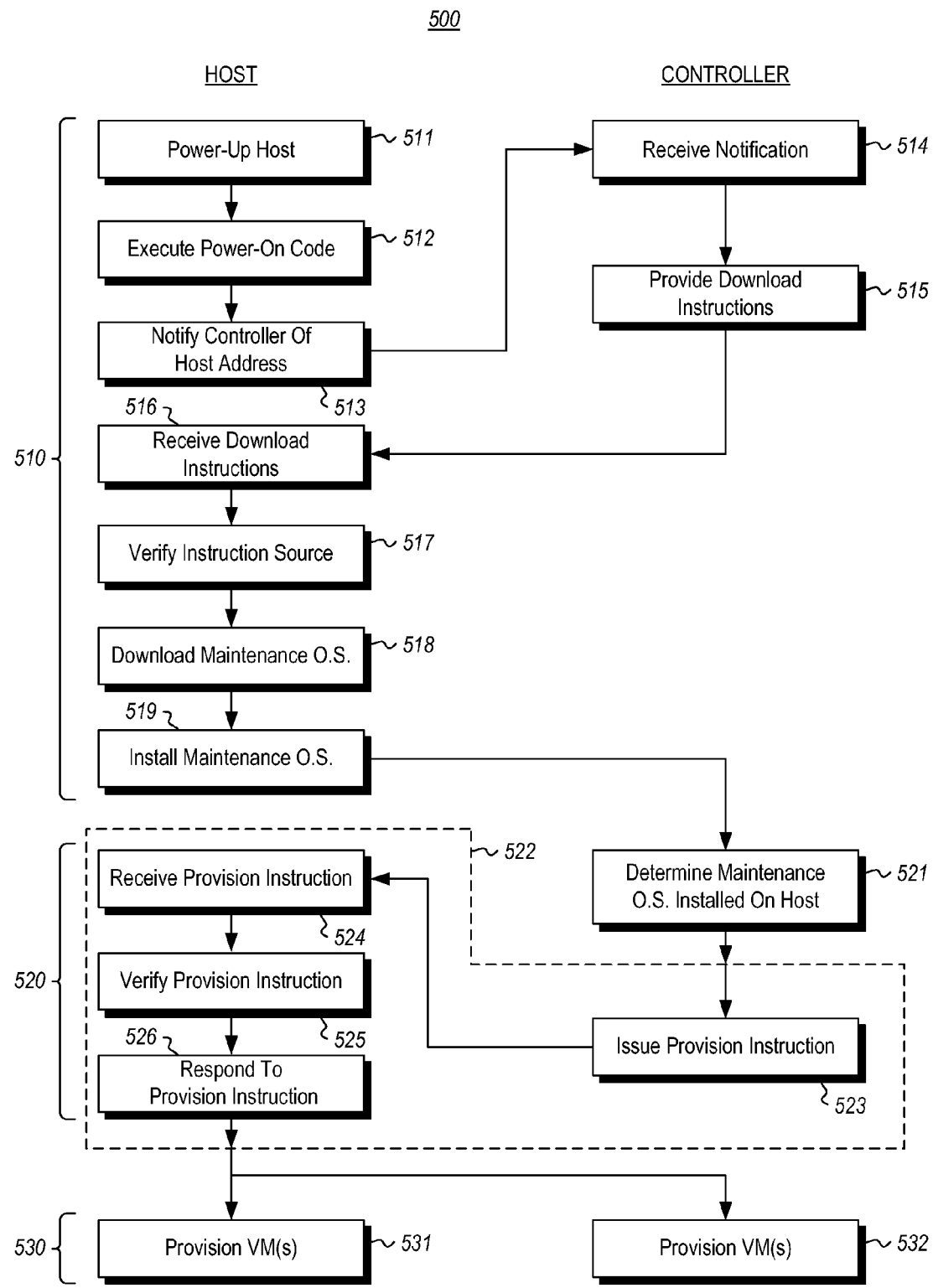
FIG. 5 illustrates a flowchart of a provisioning method in which a host computing system and a controller cooperatively interact to cause the host computing system to be provisioned.

FIG. 5 illustrates a flowchart of a provisioning method 500 in which a host computing system and a controller cooperatively interact to cause the host computing system to be provisioned. For instance, referring to FIG. 2, the host computing system 201 and the controller 202 cooperative interact to cause the host computing system 201 to be provisioned. Some acts of the method 500 are performed by the host computing system as represented in the left column of FIG. 5 under the heading "Host". Other acts of the method 500 are performed by the controller as represented in the right column of FIG. 5 under the heading "Controller". Furthermore, the provisioning method 500 may occur in three bootstrapping stages as represented by first bootstrapping stage 510, second bootstrapping stage 520, and third bootstrapping stage 530.

The method 500 is initiated upon powering up the host computing system (act 511). For instance, perhaps a technician or other worker simply presses the power actuator of the host computing system. Alternatively, perhaps a signal is dispatched to the host computing system causing the host computing system to power up. In some embodiments, this represents the entire scope of what a worker has to do to fully provision the host computing system (other than ensure a proper network connection). The remainder of the host provisioning may occur automatically using the three-stage bootstrapping process described herein. At this stage, the host/controller system 200 is represented by the system 200 of FIG. 2, in which the host computing system 201 is communicatively coupled to the controller 202 over the network 203, and in which the host computing system 201 has the bootstrap data/code 210, and example of which being the data 410 and code 420 of FIG. 4.

In response to the host being powered up, the power-on code is automatically executed (act 512). For instance, the power-on code may be the power-on code 421 illustrated in FIG. 4, which includes the controller notification code 421A.

Accordingly, the host computing system then notifies the controller of the host address (act 513). For instance, as previously described, when the controller notification code 421A is executed, the host 400 (or host 201) is caused to notify the controller 202 of the host address. This is possible as the data 410 includes the host address 411 that may be included as payload to such a message, and the controller address 412 which may be used to properly direct the message to the controller. As another embodiment, the host 400 might broadcast a request which can be received by other hosts on the network, and these hosts respond with the address of the host, the controller, or both. As another embodiment, the host 400 might retrieve one IP address from a local server, such as a DHCP server, and then use this IP address in communicating with the remote controller 202. As part of this communication, the controller may assign the host 400 another address and potentially order the host to store this address in its data 410.

Assuming proper network connectivity, the controller then receives the notification of the host address (act 514). If the worker at the host notices that the provisioning of the host does not automatically occur, the worker might recheck the network connectivity, perhaps verify proper operation of the controller, and then repower-up the host computing system. However, assuming proper operation, the controller now has possession of the host address. As an alternative embodiment, if this or any other step of provisioning fails, an alert, job ticket, or email might be sent to workers responsible for hosts in the physical location of host 400.

In response to the notification, the controller provides a download instruction (act 515) to the host computing system. The host computing system then receives the download instruction (act 516) from the controller. For instance, referring to FIG. 2, the host computing system 201 notifies the controller 202 of the address of the host computing system 201, and responsively the controller 202 provides a download instruction to the host computing system 201.

Optionally, the host computing system 201 then verifies that the download instruction was transmitted by the controller (act 517). This may be accomplished using the security data 413 of FIG. 4. For instance, if the security data 413 were a public key corresponding to a private key used to encrypt such a download instruction, the public key may be used to decrypt the download instruction, allowing the host computing system to interpret the download instruction.

The host computing system is then structured to respond to the download instruction by automatically downloading a maintenance operating system (act 518), which is then installed on the host (act 519). For instance, the receipt of the download instruction may trigger download code 422A. The download instruction may perhaps be multiple instructions. For instance, there may be one instruction from the controller that causes the host computing system to download the maintenance operating system, and another instruction from the controller that causes the host computing system to install the maintenance operating system. Alternatively or in addition, there may be a configuration instruction that causes the host operating system to set one or more configuration settings on the maintenance operating system. Thus, wherever an instruction is described as being transmitted from the controller to the host computing system, one or more constituent instruction messages may be transmitted to accomplish this.

Figure 6:
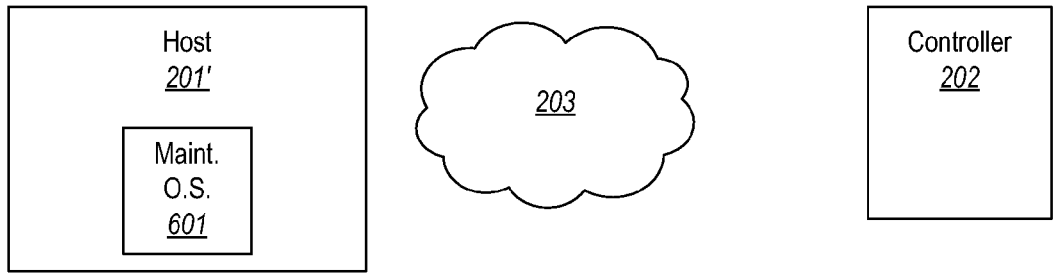
FIG. 6 illustrates the system of FIG. 2 after a first stage of provisioning in which a maintenance operating system is installed on the host computing system.

This completes stage one 510 (or the first level) of the bootstrapped provisioning process. FIG. 6 illustrates a system 600 that is similar to the system 200 of FIG. 2, except that now the host computing system 201 is altered (as represented by host computing system 201') to include the installed maintenance operation system 601). The bootstrap data/code 210 is not illustrated as it is less relevant to subsequent stages of bootstrapped provisioning, though the bootstrap data/code 210 may still be present on the host computing system 201'. For instance, such bootstrap data/code 210 may be useful to re-perform the bootstrap provisioning of the host computing system should the software become corrupt on the host computing system.

In stage two 520 of the provisioning process, the host computing system 201' now has a more sophisticated and diverse set of instructions that it is capable of responding to since the maintenance operating system 601 is installed. The second stage 520 may begin once the controller determines that the maintenance operating system is installed on host computing system (act 521). For instance, the host computing system 201' may transmit a notification message to the host computing system 202 once the maintenance operating system 601 is installed on the host computing system 201'. Alternatively or in addition, the controller 202 may allow a certain amount of time to pass before periodically transmitting a confirmation request to the host computing system 201'. The maintenance operating system 601 may be configured to respond to such a request, and thus the absence of a response may indicate to the controller that the maintenance operating system 601 is not yet installed. After periodic confirmation requests, a successful response may be received, allowing the controller 202 to proceed further into stage two of the bootstrapped provisioning of the host computing system 201'.

The remainder 522 of the second stage may be repeated for each of multiple provisioning instructions issued by the controller. For instance, the controller issues a provision instruction (act 523), the host computing system receives the provision instruction (act 524), the host computing system verifies that the instruction comes from the controller (act 525) (e.g., using the security data 413, or a secret previously confirmed as being provided by the controller using the security data 413). For each instruction, the host computing system responds to the provisioning instruction (act 526).

Figure 7:
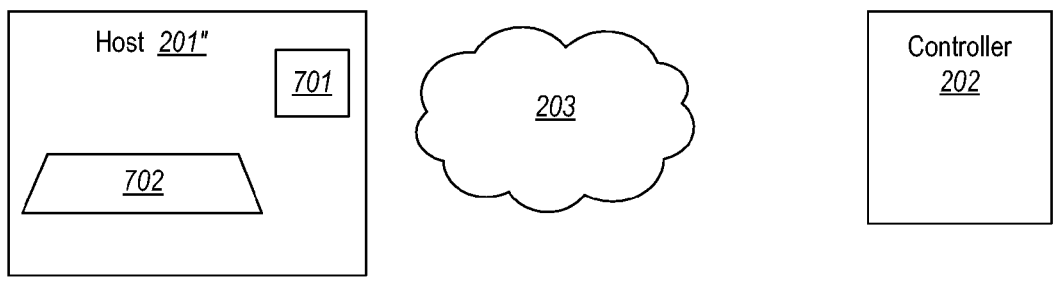
FIG. 7 illustrates the system of FIG. 2 after a second stage of provisioning in which a host agent and hypervisor are installed on the host computing system.

These additional provision instructions are designed to cause the host computing system to come up to operation with a hypervisor and a host agent. FIG. 7 illustrates a system 700 that is similar to the system 600 of FIG. 6, except that now a fully operation host operating system is present on the host computing system 202" allowing the host computing system 202" to have a host agent 701 and a hypervisor 702. For instance, the host computing system 202" may be structured as described above for the host computing system 300 of FIG. 3, except that no virtual machines are yet operational on the host computing system 202".

In the third stage 530 of the bootstrapped provisioning process, the controller 202 may now coordinate with the host agent to provision virtual machine on the host computing system. Referring to FIG. 5, the host computing system collaborates with the controller (act 531) to cooperatively provisioning virtual machine(s) on the host computing system so that the virtual machine(s) may use the hypervisor. Likewise, the controller collaborates with the host computing system (act 532) to cooperatively provisioning virtual machine(s) on the host computing system so that the virtual machine(s) may use the hypervisor.

Figure 8:
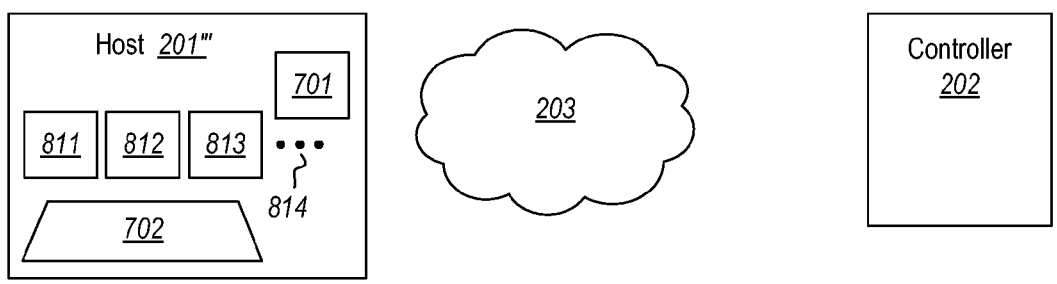
FIG. 8 illustrates the system of FIG. 2 after a third stage of provisioning in which virtual machines are installed on the host computing system.

FIG. 8 illustrates a system 800 that is similar to the system 700 of FIG. 6, except that now virtual machine 811, 812, and 813 operate in the host computing system 201' above the hypervisor 702. The ellipses 814 represent flexibility in the number of virtual machine rendered operational by the host computing system 201'". For instance, the host computing system 202'" may be structured as described above for the host computing system 300 of FIG. 3.

Figure 9:
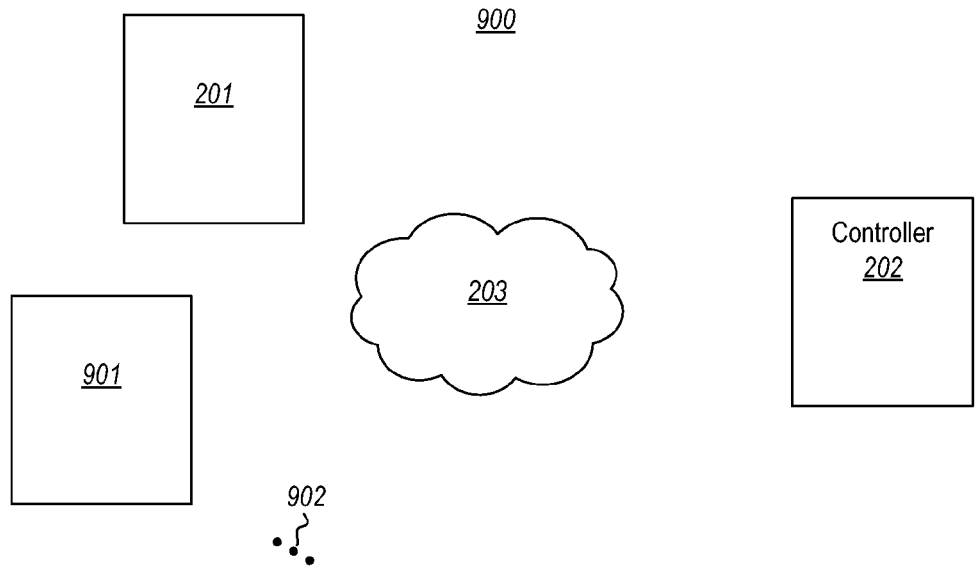
FIG. 9 illustrates a system in which the controller assists in provisioning and controller multiple host computing systems.

FIGS. 2 through 8 describe a process in which a controller 202 assists in provisioning a host computing system 201. However, the controller 202 may perform the same process multiple times to provision multiple host computing systems. For instance, FIG. 9 illustrates a system 900, which is similar to the systems 200, 500, 600 and 700 of FIGS. 2, 5, 6 and 7, respectively, except that now there is a second host computing system 901 communicatively coupled to the controller 202 over the network 203. Furthermore, the ellipses 902 represent that there may be further host computing systems communicatively coupled to the controller 202 over the network 203. These other host computing systems may also be provisioned using the controller 202 in the same manner as described above for the host computing system 201.

As part of the second stage of provisioning, the controller may offload none, or some of the controller functionality to the host agent of the host computing system. Thus, some of the host computing systems 201, 901 and 902 may have no controller functionality within the host computing system, whereas others of the host computing systems 201, 901 and 902 may have some controller functionality within the host computing system. This enables varying levels of controller functionality to be offloaded to the host computing systems.

Figure 10:
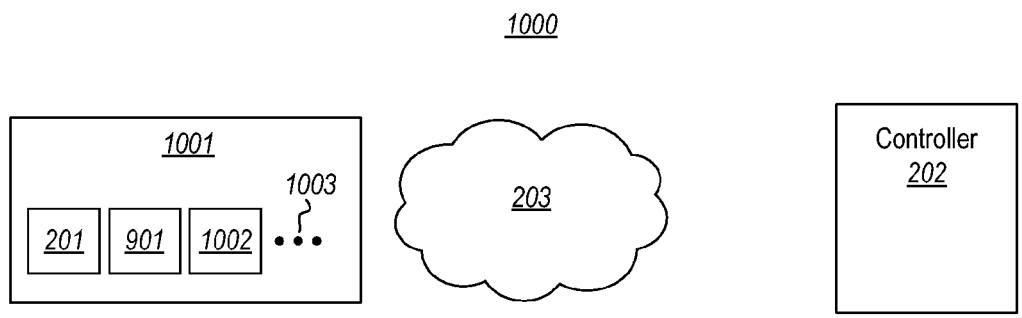
FIG. 10 illustrates a system in which the controller assists in provisioning and controller multiple host computing systems within a single cluster of host computing systems.

The controller 202 may provision host computing systems from the same cluster of host operating systems. For instance, FIG. 10 illustrates a system 1000 that is similar to the system 900 of FIG. 9, except that the host computing system 901 is illustrated as being in the same cluster 1001 of host computing systems as the host computing system 201. For instance, cluster 1001 includes host computing system 201, host computing system 901, host computing system 1002, as well as potentially other host computing systems as represented by the ellipses 1003. Note that the controller 202 is not present within the cluster 1001. The cluster 1001 represents a single location that holds multiple host computing systems locally.

Figure 11:
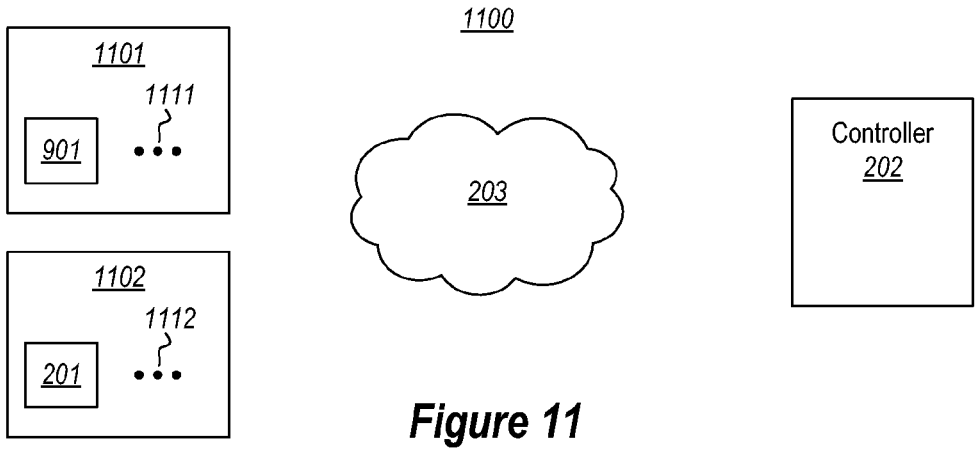
FIG. 11 illustrates a system in which the controller assists in provisioning and controller multiple host computing systems within different clusters of host computing systems.

Alternatively or in addition, the controller 202 may provision host computing systems from different clusters. For instance, FIG. 11 illustrates a system 1100 that is similar to the system 900 of FIG. 9, except that the host computing system 901 is illustrated as being in the different cluster 1101 of host computing systems as the host computing system 201, which is in cluster 1102. For instance, cluster 1101 includes host computing system 901 as well as potentially other host computing systems as represented by the ellipses 1111. Furthermore, cluster 1102 includes host computing system 201 as well as potentially other host computing systems as represented by the ellipses 1112.

Accordingly, the principles described herein allow remote provisioning and controlling of a host computing system. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system in which a host computing system is configured to notify a controller of the host computing system's address and download a maintenance operating system from the controller, the system comprising:
   a controller; and
   a host computing system communicatively coupled to the controller over a network, the host computing system having a persistent memory that stores:
   an address of the host computing system,
   an address of the controller,
   security data that allows the host computing system to recognize communications as being transmitted by the controller, wherein the security data comprises a public key corresponding to a private key held by the controller,
   power-on code that is configured to automatically, upon the host computing system powering up:
   retrieve from memory the stored address of the controller,
   retrieve from memory the stored address of the host computing system, and,
   as an initial communication with the controller subsequent to the host computing system powering up, notify the controller of the address of the host computing system by sending a message addressed to the address of the controller, the message including the address of the host computing system, and
   download code that is configured to, after having sent the message to the controller and in response to receiving a download instruction from the controller, automatically download, install, and execute a maintenance operating system instance wherein, once the maintenance operating system instance is installed on the host computing system, the host computing system is then configured to respond to further provisioning instructions from the controller.

2. The system in accordance with claim 1, wherein the download instruction from the controller is encrypted by the controller using the private key, thereby allowing the host computing system to decrypt the download instruction using the public key.

3. The system in accordance with claim 1, wherein the host computing system is a first host computing system, the persistent memory is a first persistent memory, the power-on code is first power-on code, download code is first download code, the download instruction is a first download instruction, and the maintenance operating system instance is a first maintenance operating system instance, the system further comprising:
   a second host computing system communicatively coupled to the controller over a network and having a second persistent memory that stores an address of the second host computing system and the address of the controller, the second persistent memory further including:
   1) second power-on code that is configured to automatically notify the controller of the address of the second host computing system using the address of the controller; and
   2) second download code that is configured to automatically download and install a second maintenance operating system instance in response to a second download instruction from the controller, wherein the second host computing system may respond to further instructions from the controller once the second maintenance operating system instance is installed on the second host computing system.

4. The system in accordance with claim 3, wherein the controller offloads a portion of controller functionality to a host agent of the second host computing system that is not offloaded to a host agent of the first host computing system.

5. The system in accordance with claim 3, wherein the first host computing system and the second host computing system are located within the same cluster of host computing systems.

6. The system in accordance with claim 3, wherein the first host computing system is located in a different cluster than the second host computing system.

7. The system in accordance with claim 1, wherein the controller is located within a cluster of host computing systems that does not include said host computing system.

8. The system in accordance with claim 1, wherein the further instructions comprise instructions that the host computing system may respond to using the maintenance operating system instance to provision the host computing system with a host agent and a hypervisor.

9. The system in accordance with claim 8, wherein the controller is configured to coordinate with the host agent to provision virtual machines on the host computing system.

10. A method for a host computing system to provision the host computing system by sending the host computing system's address to a remote controller and receiving a download instruction from the remote controller, the method comprising:
    upon and in response to a powering up of the host computing system, automatically executing power-on code on the host computing system, the power-on code, when executed, causing the host computing system to:
    notify a remote controller of the address of the host computing system by sending, over a network, to an address of the remote controller a message which includes an address of the host computing system,
    wherein the power-on code, the address of the controller, and the address of the host computing system are each stored in persistent memory on the host computing system such that each is available to the host computing system upon powering up of the host computing system and prior to an initial communication with the remote controller, the persistent memory also storing security data that allows the host computing system to recognize communications as being transmitted by the controller, wherein the security data comprises a public key corresponding to a private key held by the controller;

receiving a download instruction from the controller subsequent to notifying the controller of the address of the host computing system; and in response to the download instruction, the host computing system automatically downloading and installing a maintenance operating system.

11. The method in accordance with claim 10, further comprising: verifying that the download instruction was transmitted by the controller.

12. The method in accordance with claim 11, wherein the download instruction was encrypted by the controller using the private key, the act of verifying that the download instruction was transmitted by the controller comprising decrypting the download instruction using the public key corresponding to the private key.

13. The method in accordance with claim 12, wherein the private key was persistent on the host computing system prior to powering up the host computing system.

14. The method in accordance with claim 10, further comprising:

receiving one or more subsequent provisioning instructions from the controller; and an act of further provisioning the host computing system using the maintenance operating system in response to the one or more subsequent provisioning instructions.

15. The method in accordance with claim 14, wherein the further provisioning causes a hypervisor and host agent to be operational on the host computing system.

16. The method in accordance with claim 14, further comprising:

the host agent and the controller cooperatively provisioning a plurality of virtual machines on the host computing system so as to operate using the hypervisor.

* * * * *